US012584645B2

(12) United States Patent
Wang et al.

(10) Patent No.: US 12,584,645 B2
(45) Date of Patent: Mar. 24, 2026

(54) ROOM BOUNDARY DETECTION

(71) Applicant: TEXAS INSTRUMENTS INCORPORATED, Dallas, TX (US)

(72) Inventors: Dan Wang, Allen, TX (US); Slobodan Jovanovic, Bethesda, MD (US); Sandeep Rao, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 648 days.

(21) Appl. No.: 17/876,927

(22) Filed: Jul. 29, 2022

(65) Prior Publication Data

US 2023/0408120 A1     Dec. 21, 2023

(30) Foreign Application Priority Data

Jun. 15, 2022    (IN) .............................. 202241034169

(51) Int. Cl.
G01S 13/89        (2006.01)
F24F 11/30        (2018.01)
G05B 15/02        (2006.01)
F24F 120/14       (2018.01)

(52) U.S. Cl.
CPC .............. F24F 11/30 (2018.01); G01S 13/89 (2013.01); G05B 15/02 (2013.01); *F24F 2120/14* (2018.01); *G05B 2219/2642* (2013.01)

(58) Field of Classification Search
CPC ....... F24F 11/30; F24F 2120/14; G01S 13/89; G01S 13/88; G01S 7/415
See application file for complete search history.

(56) References Cited

U.S. PATENT DOCUMENTS

| | | | | |
|---|---|---|---|---|
| 8,849,523 B1 * | 9/2014 | Chan | .................... | A01G 25/167 |
| | | | | 701/50 |
| 8,868,375 B1 * | 10/2014 | Christian | ............. | G01C 21/206 |
| | | | | 702/155 |
| 11,585,917 B1 * | 2/2023 | Wu | .......................... | G06T 17/05 |
| 2004/0109589 A1 * | 6/2004 | McClurg | ............ | G06V 40/1324 |
| | | | | 382/124 |
| 2020/0064784 A1 | 2/2020 | Steiner | | |
| 2020/0209382 A1 | 7/2020 | Iizuka et al. | | |
| 2021/0105884 A1 * | 4/2021 | Izu | .......................... | H05B 47/13 |

(Continued)

OTHER PUBLICATIONS

PCT Search Report, Application No. PCT/US2023/068267, mailed Sep. 13, 2023, 4 pages.

(Continued)

*Primary Examiner* — Mohammad Ali
*Assistant Examiner* — Vincent W Chang
(74) *Attorney, Agent, or Firm* — Michael T. Gabrik; Frank D. Cimino

(57)        ABSTRACT

A method is provided. In some examples, the method includes receiving a first user input at processing circuitry. The method also includes determining, by the processing circuitry based on a signal from a radar sensor, movement of a user in a room after receiving the first user input. In addition, the method includes determining, by the processing circuitry, a first estimated location of a first wall in the room based on a first portion of the movement of the user. The method further includes determining, by the processing circuitry, a second estimated location of a second wall in the room based on a second portion of the movement of the user.

20 Claims, 11 Drawing Sheets

(56) References Cited

U.S. PATENT DOCUMENTS

| | | | | |
|---|---|---|---|---|
| 2021/0141082 A1* | 5/2021 | Moshe | .................. | G06V 20/64 |
| 2023/0127307 A1* | 4/2023 | Noris | .................... | G06T 19/006 |
| | | | | 345/424 |
| 2023/0150129 A1* | 5/2023 | Jung | ....................... | G01S 7/003 |
| | | | | 700/245 |
| 2023/0350004 A1* | 11/2023 | Cnaan-On | ............... | G01S 13/42 |
| 2025/0014279 A1* | 1/2025 | Ahmed | .................. | G06T 17/20 |

OTHER PUBLICATIONS

Texas Instruments Inc., "Design Guide: TIDEP-01000; People Tracking and Counting Reference Design Using mmWave Radar Sensor," Apr. 2020, 33 pages.

* cited by examiner

LINE
672A

TRACE
670A

BORESIGHT
ORIENTATION
612A

SENSOR
310

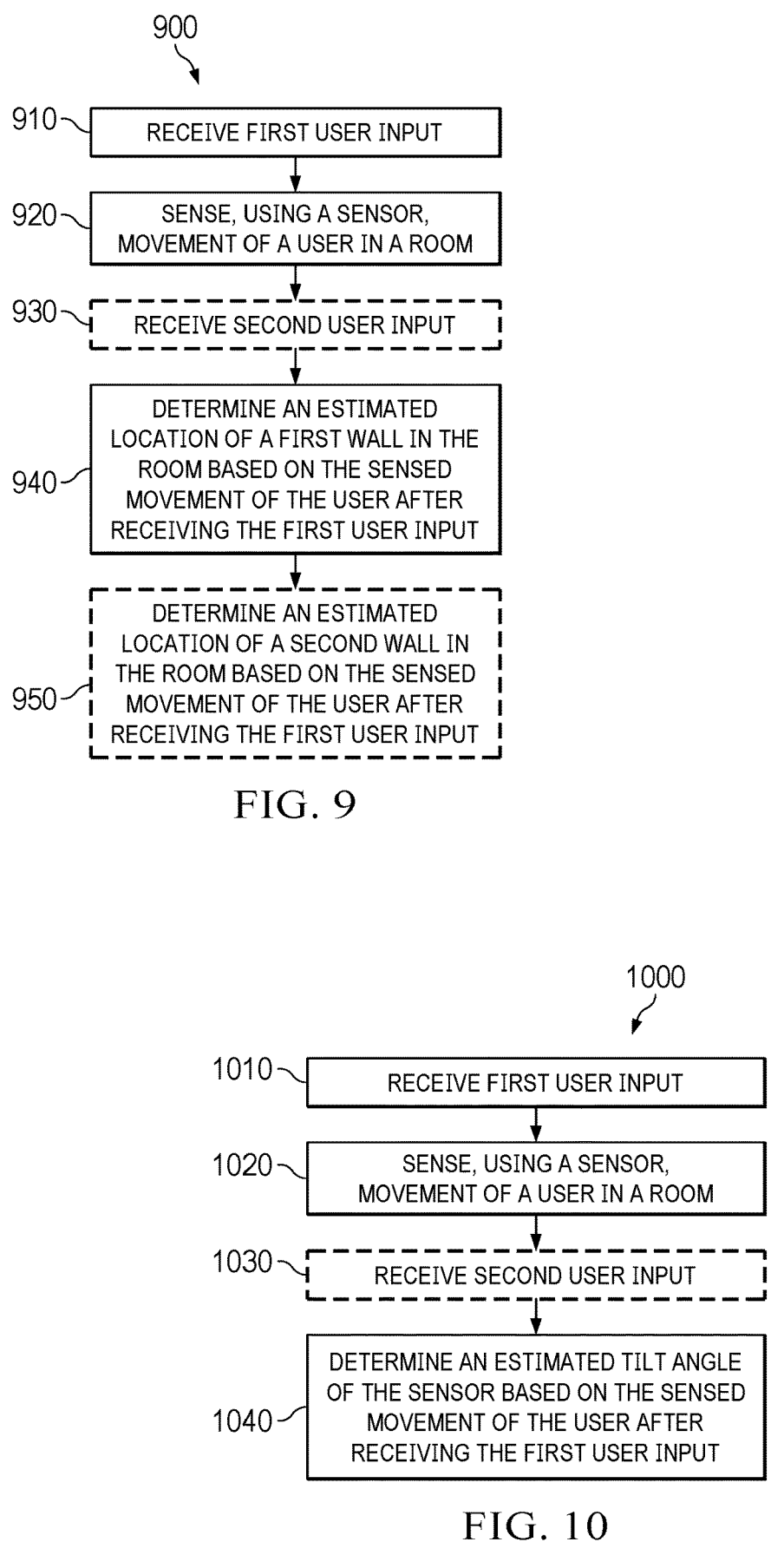

900

910 — RECEIVE FIRST USER INPUT

920 — SENSE, USING A SENSOR, MOVEMENT OF A USER IN A ROOM

930 — RECEIVE SECOND USER INPUT

940 — DETERMINE AN ESTIMATED LOCATION OF A FIRST WALL IN THE ROOM BASED ON THE SENSED MOVEMENT OF THE USER AFTER RECEIVING THE FIRST USER INPUT

950 — DETERMINE AN ESTIMATED LOCATION OF A SECOND WALL IN THE ROOM BASED ON THE SENSED MOVEMENT OF THE USER AFTER RECEIVING THE FIRST USER INPUT

1010 — RECEIVE FIRST USER INPUT

1020 — SENSE, USING A SENSOR, MOVEMENT OF A USER IN A ROOM

1030 — RECEIVE SECOND USER INPUT

1040 — DETERMINE AN ESTIMATED TILT ANGLE OF THE SENSOR BASED ON THE SENSED MOVEMENT OF THE USER AFTER RECEIVING THE FIRST USER INPUT

FIG. 10

ROOM BOUNDARY DETECTION

This application claims the benefit of Indian Provisional Patent Application No. 202241034169, filed Jun. 15, 2022, which is hereby incorporated by reference herein in its entirety.

BACKGROUND

Internet of things sensors are becoming more common in buildings for uses such as safety (e.g., smoke or carbon monoxide detectors), heating, ventilation, and air conditioning (HVAC), security, comfort, and entertainment. For example, a sensor can detect motion or occupancy for an HVAC system, and the HVAC system can control temperature or air flow based on whether motion or occupancy has been detected. If a room is unoccupied, the HVAC system can conserve energy by reducing airflow to the room. As another example, a sensor can detect motion for a security system so that the security system can determine whether the building is occupied.

Traditional sensors may not be capable of accurately sensing the location of all of the walls in a room. One reason is that a signal transmitted by the sensor can take multiple paths through a room before arriving at the receiver of the sensor. The signal may travel to the left wall, then across the room to the right wall, and back and forth, before returning to the sensor. The time of travel of this signal results in a determination that the room is much larger than the actual dimensions based on the incorrect assumption that the signal reflected off only one wall. This situation can result in the sensor detecting "ghost targets" outside of the actual, physical boundaries of the room because of the multi-path travel of signals transmitted by the sensor.

SUMMARY

In some examples, a method includes receiving a first user input at processing circuitry. The method also includes determining, by the processing circuitry based on a signal from a radar sensor, movement of a user in a room after receiving the first user input. In addition, the method includes determining, by the processing circuitry, a first estimated location of a first wall in the room based on a first portion of the movement of the user. The method further includes determining, by the processing circuitry, a second estimated location of a second wall in the room based on a second portion of the movement of the user.

In further examples, a device includes a radar sensor configured to sense movement of a user in a room. The device also includes processing circuitry configured to receive a first user input and determine, based on a signal from the sensor, the movement of the user in the room after receiving the first user input. In addition, the processing circuitry is configured to determine a first estimated location of a first wall in the room based on a first portion of the movement of the user. The processing circuitry is also configured to determine a second estimated location of a second wall in the room based on a second portion of the movement of the user.

In yet further examples, a non-transitory computer-readable medium has executable instructions stored thereon, configured to be executable by processing circuitry for causing the processing circuitry to receive a first user input and determine, based on a signal from a radar sensor, movement of a user in a room after receiving the first user input. In addition, the instructions are configured to be executable by the processing circuitry for further causing the processing circuitry to determine a first estimated location of a first wall in the room based on a first portion of the movement of the user. The instructions are also configured to be executable by the processing circuitry for further causing the processing circuitry to determine a second estimated location of a second wall in the room based on a second portion of the movement of the user.

BRIEF DESCRIPTION OF THE DRAWINGS

Features of the present invention may be understood from the following detailed description and the accompanying drawings. In that regard:

FIG. 9 is a flow diagram of a method of determining room boundary locations according to some aspects of the present disclosure.

FIG. 10 is a flow diagram of a method of determining the orientation of a sensor according to some aspects of the present disclosure.

DETAILED DESCRIPTION

Figure 1:
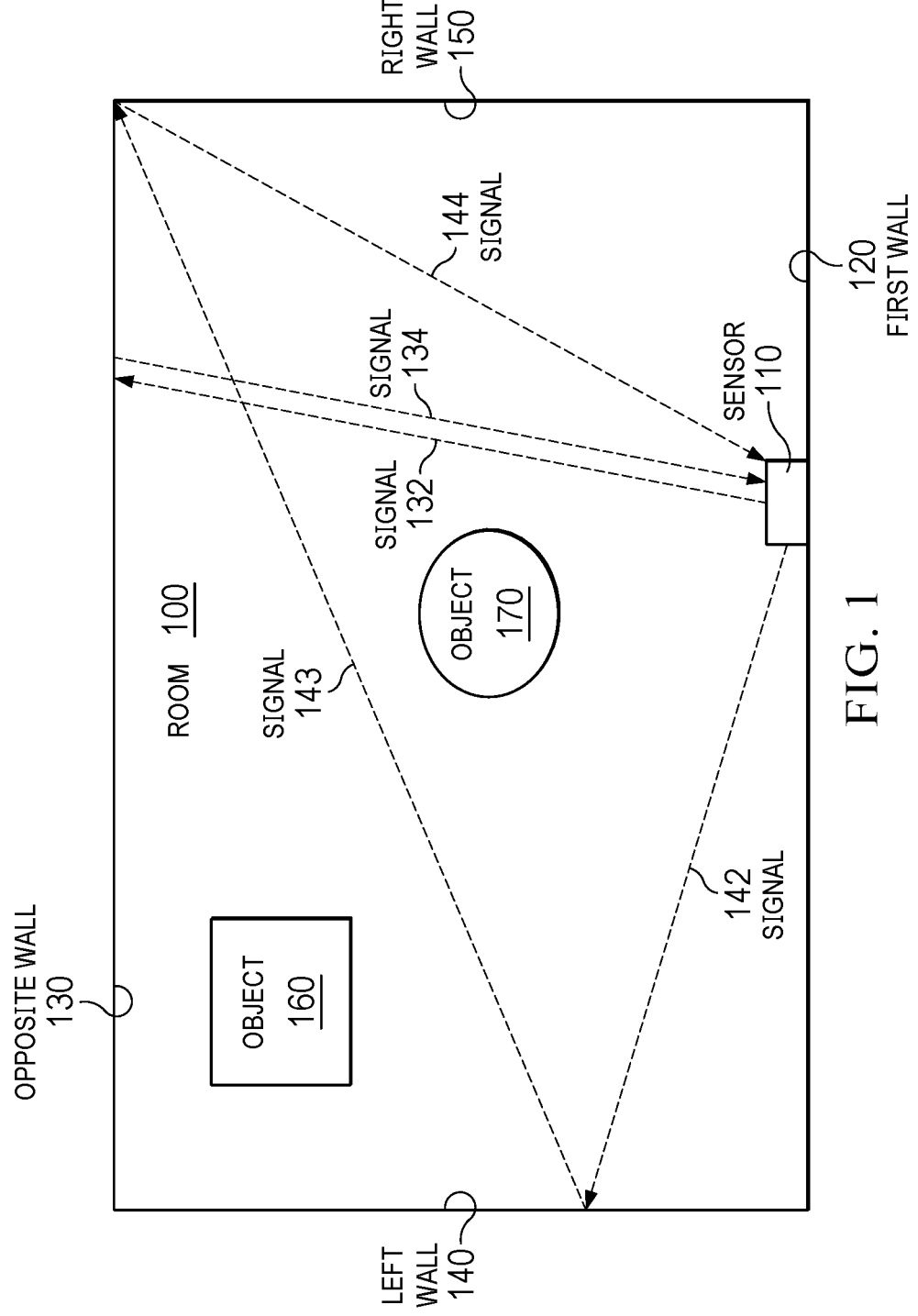
FIG. 1 is a top-view diagram of a room including a sensor configured to determine the location of objects according to some aspects of the present disclosure.

Specific examples are described below in detail with reference to the accompanying figures. It is understood that these examples are not intended to be limiting, and unless otherwise noted, no feature is required for any particular example. Moreover, the formation of a first feature over or on a second feature in the description that follows may include examples in which the first and second features are formed in direct contact and examples in which additional features are formed between the first and second features, such that the first and second features are not in direct contact.

A sensor installed in a room may be capable of detecting the location of objects within the room. To detect the location of an object in the room, the sensor can transmit a signal and receive a reflection of the signal from the object. The distance from the sensor to the object (i.e., the range) can be determined based on the round-trip time of travel of the signal between the sensor and the object. Additionally or alternatively, the range can be determined based on the frequency of the reflected signal, as received by the sensor, in the case of a frequency-modulated continuous wave (FMCW) radar.

The sensor can determine the locations of the walls in a room, which are stationary objects. In examples in which a sensor is mounted on or close to a first wall, the sensor may generate a fairly accurate estimate of the location of a second wall that is opposite from the first wall. Depending on the shape of the room and the orientation of the sensor, some of the signals transmitted by the sensor may reflect off the opposite wall and return directly to the sensor.

In contrast, the sensor may generate less accurate estimates of the location of the left and right walls in the room because of multi-path returns. Some of the signals transmitted by the sensor may reflect off the left wall, then reflect off another object such as the right wall, before returning to the sensor. Thus, depending on the shape of the room and the orientation of the sensor, location estimates for the left and right walls may be less accurate than location estimates of other stationary objects in the room such as the opposite wall. This issue may be especially important for indoor sensor applications because of the number of walls and other objects that can cause multi-path returns.

Determining the locations of the walls in a room may be important for HVAC systems. An HVAC system can use the room dimensions (e.g., length and width) to determine the room volume, which can be used to determine the airflow to deliver to the room. Thus, determining the locations of the walls in a room is useful for comfort and energy conservation. In addition, determining the locations of the walls in a room can be useful for determining the number of people in a room, which can be used for safety, security, HVAC, geo-fencing, and other purposes.

In accordance with the techniques of this disclosure, the sensed movement of a user is used to determine the locations of walls in a room. To assist the sensor in determining the locations of the walls, the user may walk or move to a first wall in the room and touch the first wall. Then, the user may walk to and touch a second wall in the room. The sensing phase of this user-assisted wall-detection procedure may take less than one minute. The sensor may be able to sense the movement of the user much more accurately than the sensor is able to sense the location of the stationary objects in the room. The sensor may be capable of distinguishing and sensing the location of small movements such as a user extending an arm or a finger to touch a wall.

Although the techniques of this disclosure apply to all types of sensors including pulsed radar, FMCW radar may be especially well suited to sensing moving objects because even small, slow movements cause a frequency shift due to the Doppler effect. For example, radar can detect a person's breathing during sleep, which is very fine motion. Introducing the Doppler domain to the procedures described herein improves the accuracy of the procedures because of the sensor's ability to distinguish moving objects from stationary objects. Moreover, radar may have a range resolution on the order of one or two inches, depending on the wavelengths transmitted by the radar. This range resolution may be sufficient for applications such as motion sensing and occupancy detection.

Processing circuitry may be configured to determine estimated locations of the boundaries of a room based on the sensed movement of the user. The determination of the estimated location of a wall is based on the assumption that the user has touched or moved very close to the wall. To further improve the accuracy of these determinations, the processing circuitry may be configured to also use the static point cloud for the room to refine the estimated locations of the walls. The static point cloud includes the sensed locations of the stationary objects in the room. The sense can gather data to create the static point cloud without any assistance from the user. Although the static point cloud data may not be as accurate as the sensed movement data, combining the two data sets may result in greater accuracy than using either data set alone.

In some examples, the user initiates the wall-detection procedure for sensing the movements of the user touching the walls. For example, the user may provide user input to the sensor or to processing circuitry that is communicatively coupled to the sensor, where the user input indicates that the user-assisted wall-detection procedure should begin. The user input may include the user pushing a button or touchscreen on the sensor or on a remote device that is communicatively coupled to the sensor. Additionally or alternatively, the user input may include user interaction with a computing device such as a mobile phone or tablet running a software application. As further non-limiting examples, the user input may include the user performing a predetermined gesture in the field of view of the sensor or making a predetermined sound within range of a microphone. This initial user input allows for processing circuitry to determine the room boundaries based on a limited data set of sensed movements, rather than using the static point cloud or sensed movements over the operational lifetime of the sensor to determine the room boundaries. A large amount of storage space would be taken up by the data collected over the operational lifetime of the sensor. In contrast, the techniques of this disclosure may take up less storage space and/or be achievable in a shorter time than using data over the operational lifetime of the sensor.

Processing circuitry may be able to determine the location of a wall based on the sensed movement of a user touching a single spot on a wall. However, the single spot on the wall may not provide data on the orientation of the wall relative to the sensor. In some examples, the sensor is mounted on a wall in a rectangular room with the boresight, lens, antenna array, etc. oriented parallel or perpendicular to every wall in the room. However, in other examples, the sensor may be mounted at an angle other than ninety degrees or one hundred and eighty degrees (e.g., an oblique angle) relative to the walls in the room.

To assist the processing circuitry in determining the angle of the sensor relative to the walls, floor, and/or ceiling, the user may walk or move along a line that is approximately parallel or perpendicular to a wall in the room. The processing circuitry may be capable of determining the movement of the user along this line with greater accuracy than the processing circuitry can determine the extent of each wall in the room. The processing circuitry may be configured to use the sensed movement of the user along this line to calibrate other location determinations such as the determinations of the estimated locations of the walls. This calibration technique can be used for stationary sensors that are affixed to a wall or ceiling.

The techniques of this disclosure may result in better performance for the sensor. As just one example, once the room boundaries are accurately estimated, the sensor can reject ghost targets outside of the room boundaries. In addition, another system that uses data from the sensor may experience better performance, such as for HVAC controls, security, building automation, smart home operation, people counting, and/or vital signs monitoring. Of course, these advantages are merely examples, and no advantage is required for any particular embodiment.

Examples of estimating the locations of room boundaries are described with reference to the figures below. In that regard, FIG. 1 is a top-view diagram of a room 100 including a sensor 110 configured to determine the location of objects 160 and 170 according to some aspects of the present disclosure. Sensor 110 is also configured to determine the location of walls 120, 130, 140, and 150. Although room 100 is depicted as a rectangle, the techniques of this disclosure may be used to determine the boundaries of non-rectangular rooms.

In the example shown in FIG. 1, sensor 110 is installed on first wall 120 as a wall-mounted sensor. The techniques of this disclosure can also be implemented by sensors that are mounted on the ceiling of room 100, sitting on the floor of room 100, or sitting on a table or other furniture in room 100. The techniques of this disclosure may also be implemented by a mobile device. In examples in which sensor 110 is mounted on first wall 120, sensor 110 may be installed in the middle of first wall 120 or slightly offset from the middle of first wall 120, as shown in FIG. 1. Alternatively, sensor 110 may be mounted in or near a corner of room 100, such as the corner where walls 120 and 140 intersect.

The orientation of sensor 110 is shown as parallel or perpendicular to walls 120, 130, 140, and 150 in FIG. 1, but sensor 110 may instead be installed at an oblique angle. For example, the boresight, lens, transmitter, receiver, antenna array, and/or laser of sensor 110 may be oriented at direction that is not parallel or perpendicular to any of walls 120, 130, 140, and 150. For example, sensor 110 may be mounted near a corner of room 100 with a transceiver oriented towards the center of room 100.

Sensor 110 may be configured to transmit signals 132 and 142 and receive signals 134 and 144. Sensor 110 transmits signal 132 towards opposite wall 130, and signal 132 reflects off opposite wall 130 as signal 134. Based on received signal 134, sensor 110 can determine an estimated location of a point on opposite wall 130. For example, sensor 110 can determine the distance between sensor 110 and the point on opposite wall 130 (i.e., the range) based on the time of travel of signals 132 and 134 and/or based on the frequency of signal 134. Sensor 110 can also determine the relative angle of the point on opposite wall 130 based on the angle of arrival of signal 134.

Sensor 110 also transmits signal 142 towards left wall 140, and signal 142 reflects off left wall 140 as signal 143. Signal 143 does not travel from wall 140 back towards sensor 110. Instead, signal 143 travels towards walls 130 and 150. Signal 143 reflects off wall 130 or 150 as signal 144 and returns to sensor 110. Sensor 110 can determine the distance between sensor 110 and a point on wall 130, 140, or 150 (e.g., depending on whether sensor 110 has a directional transmitter or a directional receiver). Sensor 110 can make this determination based on the time of travel of signals 142-144 and/or based on the frequency of signal 144. Because the time of travel of signals 142-144 is much larger than any round-trip path in room 100, sensor 110 may determine that signal 144 reflected off an object located outside of the actual boundaries of room 100. The multi-path travel of signals 142-144 may ultimately result in inaccurate determinations of the room dimensions and room volume, which may then result in poor performance by an HVAC system, a security system, a lighting system, an entertainment system, and/or a smart home system.

Although not shown in FIG. 1, sensor 110 can also transmit and receive signals that reflect off objects 160 and 170. In addition, FIG. 1 shows signals 132 and 142 as directional signals, but sensor 110 may be configured to transmit signals 132 and 142 as a single beam. Sensor 110 may include one or more of the following sensors: radar, lidar, ultrasound, visual light camera, infrared camera, microphone, and/or any other type of sensor. Radar sensors are especially well-suited for residential applications due to privacy concerns with cameras, but cameras are common for non-residential applications.

Although this disclosure describes sensor 110 as determining the locations of walls 120, 130, 140, and 150 and objects 160 and 170, sensor 110 can determine only estimates of the locations of walls 120, 130, 140, and 150 and objects 160 and 170. The capability of sensor 110 to determine the locations of walls 120, 130, 140, and 150 and objects 160 and 170 is limited by the range resolution and angular resolution of sensor 110. This capability is also limited by multi-path returns that cause sensor 110 to make inaccurate estimates. Thus, the determination of a location of a wall or object just an estimate of that location.

The determination of a location of wall 120, 130, 140, or 150 or object 160 or 170 can be made by processing circuitry onboard sensor 110. For example, sensor 110 may include a circuit board with processing circuitry coupled to the circuit board, where the transmitter and/or receiver of sensor 110 is coupled to the processing circuitry through the circuit board. Although this disclosure describes location determinations made by sensor 110, these location determinations may instead be made by processing circuitry that is remote from sensor 110, such as a computing system in the cloud. For example, sensor 110 may transmit data to remote processing circuitry, where the data indicates characteristics of the signal received by sensor 110. The connection between sensor 110 and the remote processing circuitry may include a wired connection, Wi-Fi, Bluetooth, or any other communication means. As another example, processing circuitry onboard sensor 110 can determine the location of walls 120, 130, 140, and 150 and objects 160 and 170 and transmit the determined locations to remote processing circuitry for further processing to determine the locations of walls 120, 130, 140, and 150.

Figure 2:
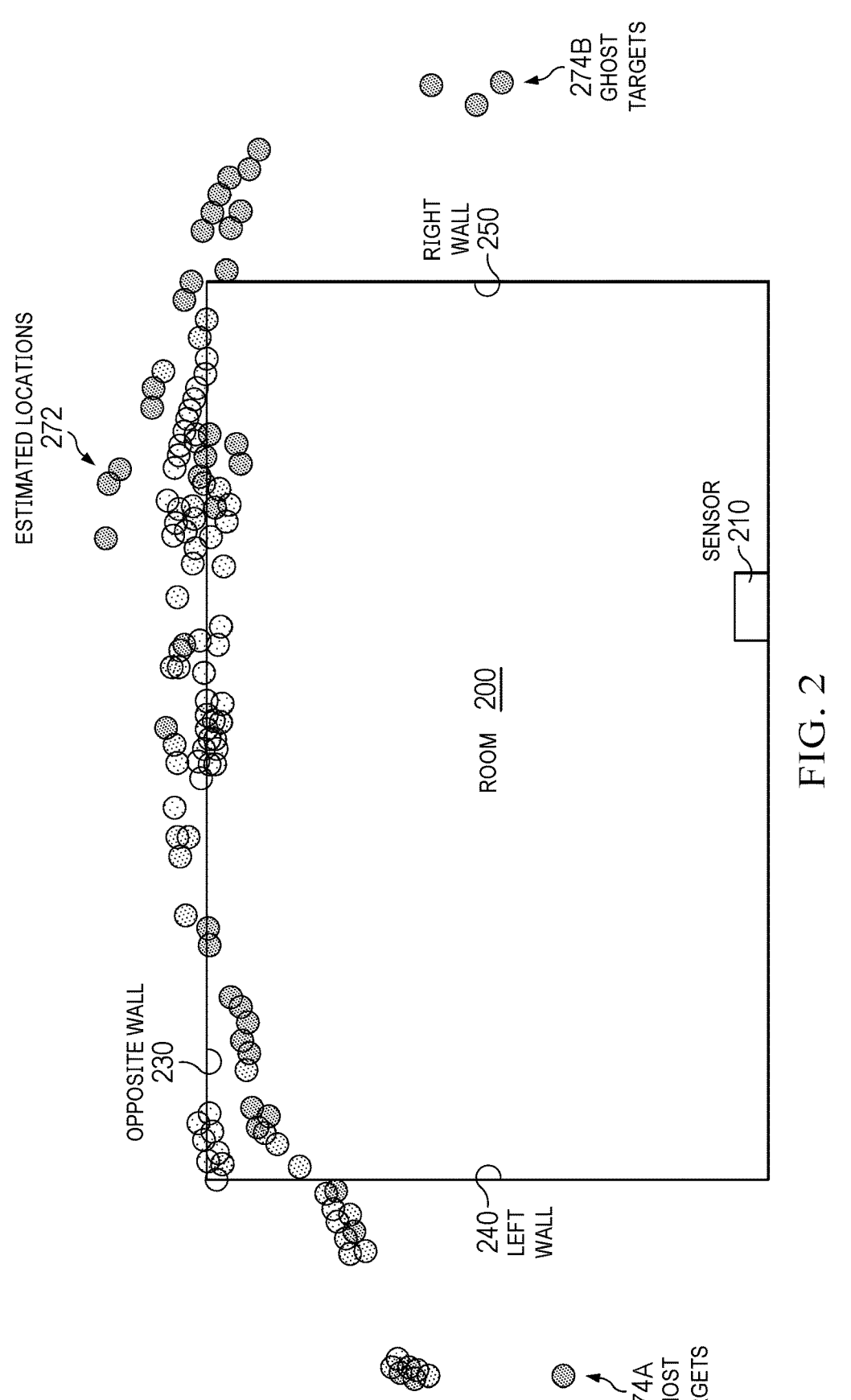
FIG. 2 is a diagram of estimated locations of room boundaries by detecting stationary objects.

FIG. 2 is a diagram of estimated locations of room boundaries 240, 250, and 250 by detecting stationary objects. In the example shown in FIG. 2, room 200 is empty of furniture and other objects, except for walls 230, 240, and 250. Estimated locations 272 and ghost targets 274A and 274B can form a static point cloud created by sensor 210 of sensed stationary, non-moving objects in room 200.

Sensor 210 uses estimated locations 272 to determine the location of opposite wall 230. Sensor 210 can also use some of estimated locations 272 and ghost targets 274A and 274B to determine the locations of left and right walls 240 and 250. Estimated locations 272 are more accurate for opposite wall 230 than for left and right walls 240 and 250. Ghost targets 274A and 274B are outside of the actual, physical boundaries of room 200 because of multi-path returns where signals bounce off walls 240 and 250 before returning to sensor 210. If sensor 210 determines ghost targets 274A as the estimated location of left wall 240, the estimated location of left wall 240 is inaccurate by a substantial margin (e.g., by more than one foot). Likewise, if sensor 210 determines ghost targets 274B as the estimated location of right wall 250, the estimated location of right wall 250 is inaccurate by a substantial margin. The static point cloud shown in FIG. 2, by itself, is not good data regarding the locations of walls 230, 240, and 250.

If sensor 210 has the correct room boundary information, sensor 210 can reject ghost targets 274A and 274B as inaccurate. Sensor 210 can use the correct boundary information to determine which of estimated locations 272 are accurate and which are inaccurate ghost targets caused by multi-path returns. In addition, with the correct room boundary information, an HVAC system can determine the room volume along with an appropriate airflow setting for comfort and energy savings. The airflow setting can include a fan speed, a zone control setting, and/or a damper setting. Thus, generating accurate boundary information for room 200 may improve the performance of sensor 210 and other systems.

Figure 3:
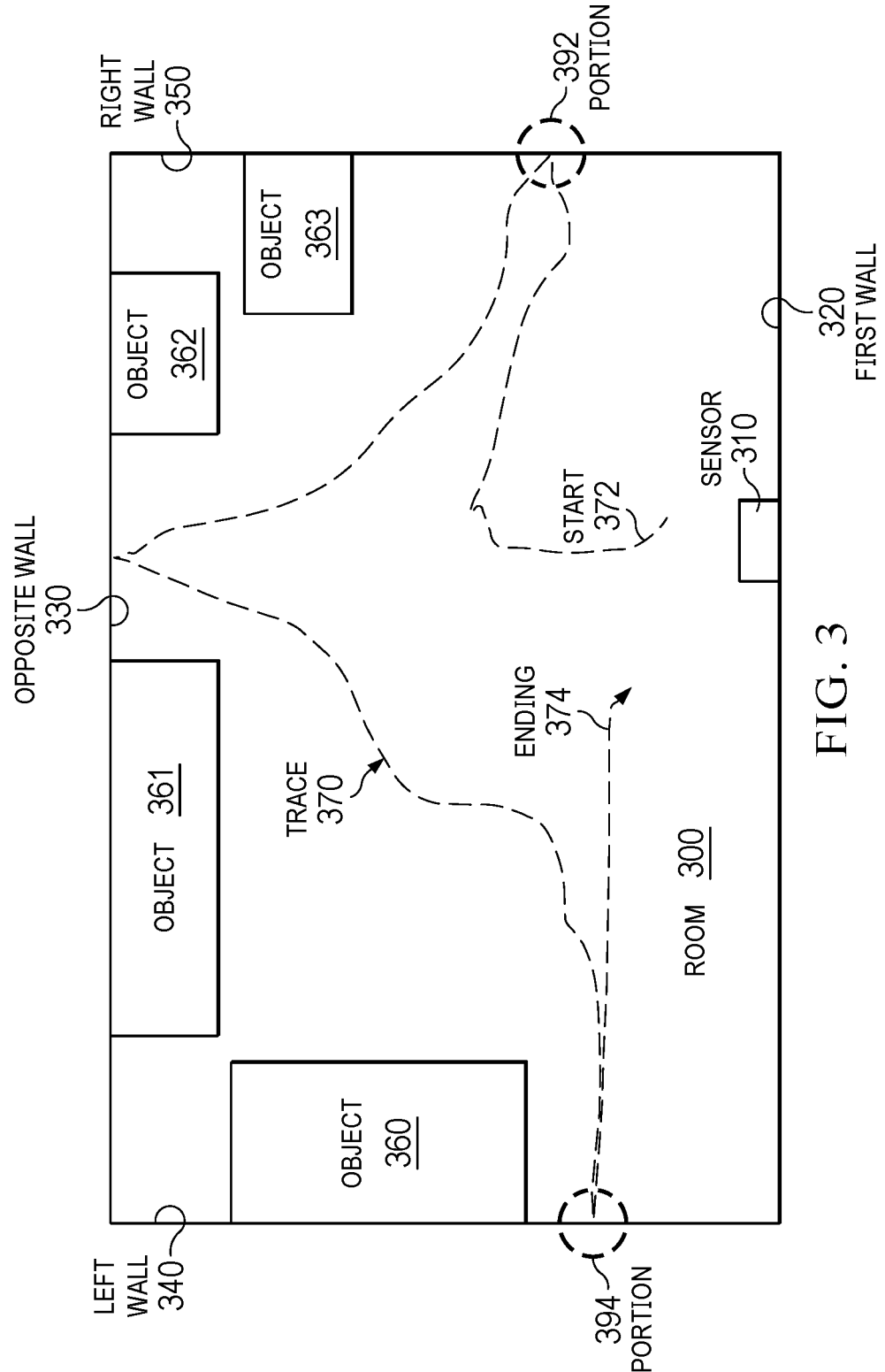
FIG. 3 is a diagram of a trace representing the movement of a person through a room according to some aspects of the present disclosure.

FIG. 3 is a diagram of a trace 370 representing the movement of a person through a room 300 according to some aspects of the present disclosure. Trace 370 represents the movement of a person during a sensing phase of a user-assisted, semi-automatic wall-detection procedure implemented by sensor 310. Sensor 310 can initiate the wall-detection procedure in response to receiving user input from the person. Sensor 310 can stop the sensing phase of the wall-detection procedure in response to receiving subsequent user input from the person. Additionally or alternatively, sensor 310 can end the sensing phase of the wall-detection procedure in response to a timer expiring or reaching a threshold value, where sensor 310 may start the timer at the start of the wall-detection procedure. In other words, ending 374 of trace 370 may coincide with the receipt of a second user input or with the expiration of a timer.

After start 372, the person moves to and touches right wall 350, before moving to and touching opposite wall 330, and then moving to and touching left wall 340. The person avoids objects 360-363 moves through room 300 to touch walls 330, 340, and 350. In examples in which room 300 has a rectangular shape, the person can touch any point on opposite wall 330, any point on left wall 340, and any point on right wall 350. In cluttered rooms, the person can complete the procedure by reaching out one arm to touch a wall without having to stand next to the wall, which may be obstructed by furniture.

The person may also touch first wall 320, but sensor 310 may be capable of determining an estimated location based on the assumption that sensor 310 is attached to first wall 320, and also based on the locations of walls 330, 340, and 350. Sensor 310 may generate trace 370 during the sensing phase (e.g., in real time), or sensor 310 may gather data during the sensing phase and form trace 370 after the sensing phase has concluded. In other words, the determination phase of the wall-detection procedure may occur simultaneous with, or after, the sensing phase of the wall-detection procedure.

To determine the locations of walls 320, 330, 340, and 350, sensor 310 may start with an assumption that room 300 has a rectangular shape that is bounded by the location of sensor 310 and the location of start 372. Sensor 310 may also assume that the user is the only person or moving object in the room. Sensor 310 can start the process with a rectangular box that includes only the location of sensor 310 and the location of the moving object (e.g., the user at start 372). Sensor 310 can set the orientation of the rectangular box based on the known orientation of sensor 310 relative to walls 320, 330, 340, and 350, which may be assumed values of zero and ninety degrees in some examples.

As trace 370 moves around room 300 to walls 330, 340, and 350, sensor 310 expands the rectangular box to encompass trace 370, while maintaining the orientation of the rectangle. In other words, sensor 370 pushes back the boundaries of the rectangular box as the user moves around room 300. Sensor 370 can track the coordinates of the user's movement throughout room 300 and set the location of walls 330, 340, and 350 to the minimum or maximum world space coordinates. Sensor 310 may be configured to determine an estimated location of right wall 350 based on portion 392 of trace 370 and to determine an estimated location of left wall 340 based on portion 394 of trace 370.

Before, during, and/or after the sensing phase of the wall-detection procedure, sensor 310 may be configured to generate a static point cloud of data representing the locations of the stationary objects in room 300, such as walls 320, 330, 340, and 350 and objects 360-363. Sensor 310 can use the static point cloud to refine the estimated locations of walls 320, 330, 340, and 350. Additionally or alternatively, sensor 310 can use the estimated wall locations from trace 370 to reject one or more of the data points in the static point cloud as ghost target(s).

Trace 370 may be more detectable for sensor 310 than walls 330, 340, and 350 objects 360-363 because sensor 310 is more capable of detecting moving objects than stationary objects. Trace 370 represents the moving portions of a person, such that trace 370 may include data points representing the movement of the arms and hands of a person. Thus, sensor 310 can detect the location of the person's arms and hands as the person touches walls 330, 340, and 350. Depending on the resolution of sensor 310, the person only needs to move close enough to reach walls 330, 340, and 350 with a hand, which is beneficial for rooms with furniture and other objects impeding the movement of the person.

The user may know about the user-assisted wall-detection procedure based on a user manual, text printed on sensor 310, a computing device running a software application, audible information outputted by sensor 310 (e.g., via a speaker, either integrated or remote), and/or some other source of information. For example, to guide the user through this process, sensor 310 may be configured to output audible instructions or send text instructions to a mobile device running a software application. Additionally or alternatively, the instruction manual or text printed on sensor 310 may provide a walk-through to the user. The user may be a homeowner with little experience setting up sensors or a professional installer is more familiar with the setup process. Either way, the procedures described in this disclosure may be simple enough for a user with no experience.

Figure 4:
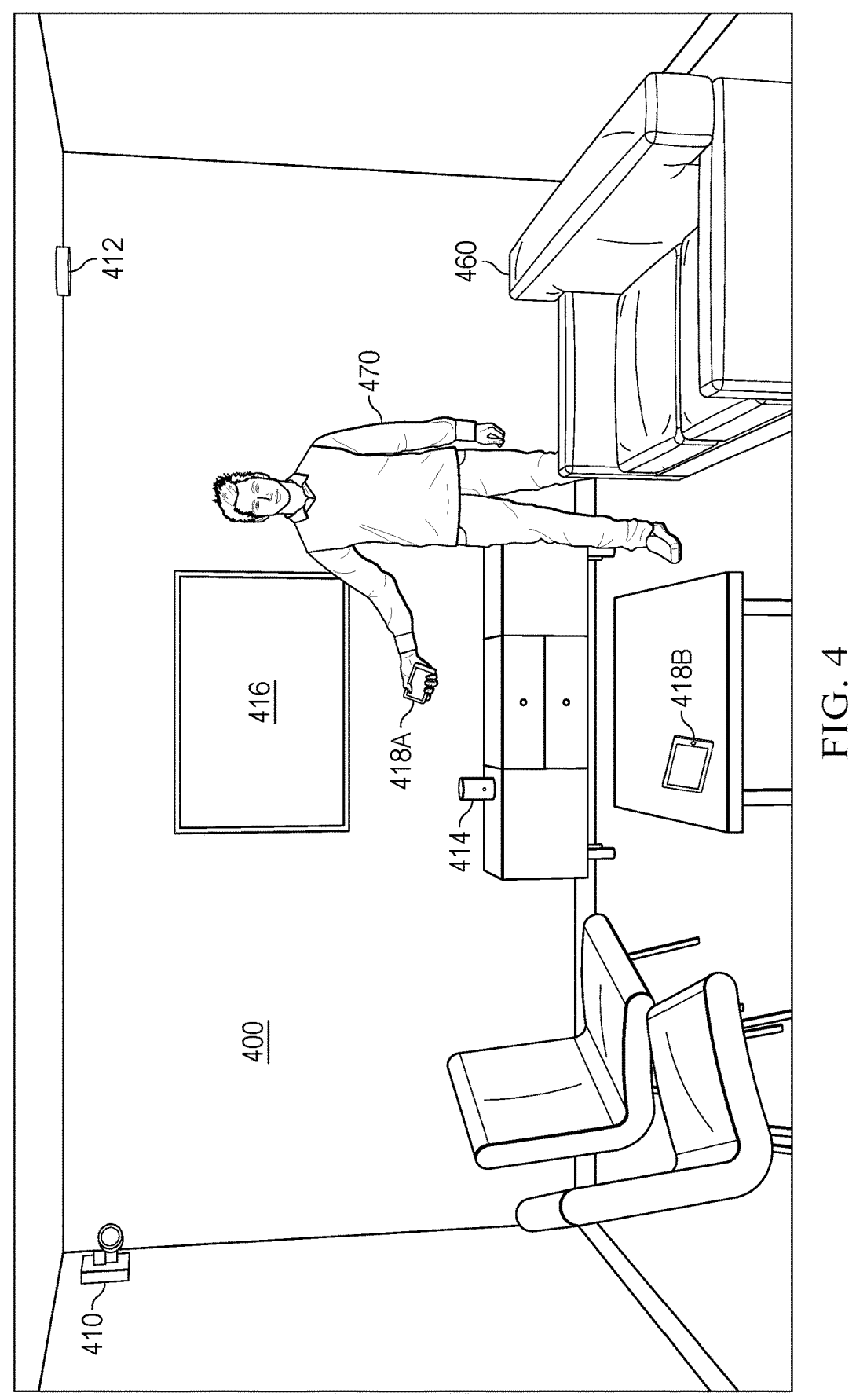
FIG. 4 is a diagram of a room including sensors, electronic devices, and a user according to some aspects of the present disclosure.

FIG. 4 is a diagram of a room 400 including sensors 410 and 412, electronic devices 414, 416, 418A, and 418B, and a user 470 according to some aspects of the present disclosure. In the example shown in FIG. 4, sensor 410 is mounted on a wall of room 400, and sensor 412 is mounted on the ceiling in room 400. Electronic device 414 is a smart home hub, electronic device 416 is a smart television mounted on a wall, and electronic devices 418A and 418B are mobile devices. Sensors 410 and 412 and electronic devices 414, 416, 418A, and 418B may be communicatively coupled to other devices or systems via Wi-Fi, Bluetooth, ethernet, etc.

Any sensor in room 400 can be used to determine estimated locations of the walls in room 400. For example, any of the following devices may include the functionality described in this disclosure for determining the location of a wall: a motion sensor, an occupancy sensor, a smoke detector, a carbon monoxide detector, a smart home hub, a smart speaker, an exhaust fan, a security sensor, a ceiling fan, an electrical outlet, any other internet of things device, or any other electronic device. Accordingly, the techniques of this disclosure can be implemented by sensor 410 or 412 or electronic device 414, 416, 418A, or 4186.

In some examples, the functionality described in this disclosure for determining the location of a wall is spread across two or more devices. For example, sensor 410 may be configured to sense objects such as furniture 460 in room 400, and one of electronic devices 414, 416, 418A, or 4186 may be configured to determine the locations of the walls in room 400 based on data from sensor 410. Alternatively, one of electronic devices 414, 416, 418A, or 418B may be configured to sense objects and transmit data to security system or an HVAC system for further processing to determine the locations of the walls in room 400 based on data from sensor 410.

Sensors 410 and 412 and electronic devices 414, 416, 418A, and 418B are located at various locations in room 400. Sensors 410 and 412 and electronic devices 414, 416, 418A, and 418B are oriented at various angles in room 400. For example, sensor 410 is installed high on a wall near a corner with a boresight oriented towards the center of room 400. Sensor 412 is installed on a ceiling and may include a sensor with a 360-degree field of view. Smart home hub 414 is sitting on a table and may include a sensor with a 360-degree field of view.

Figure 5:
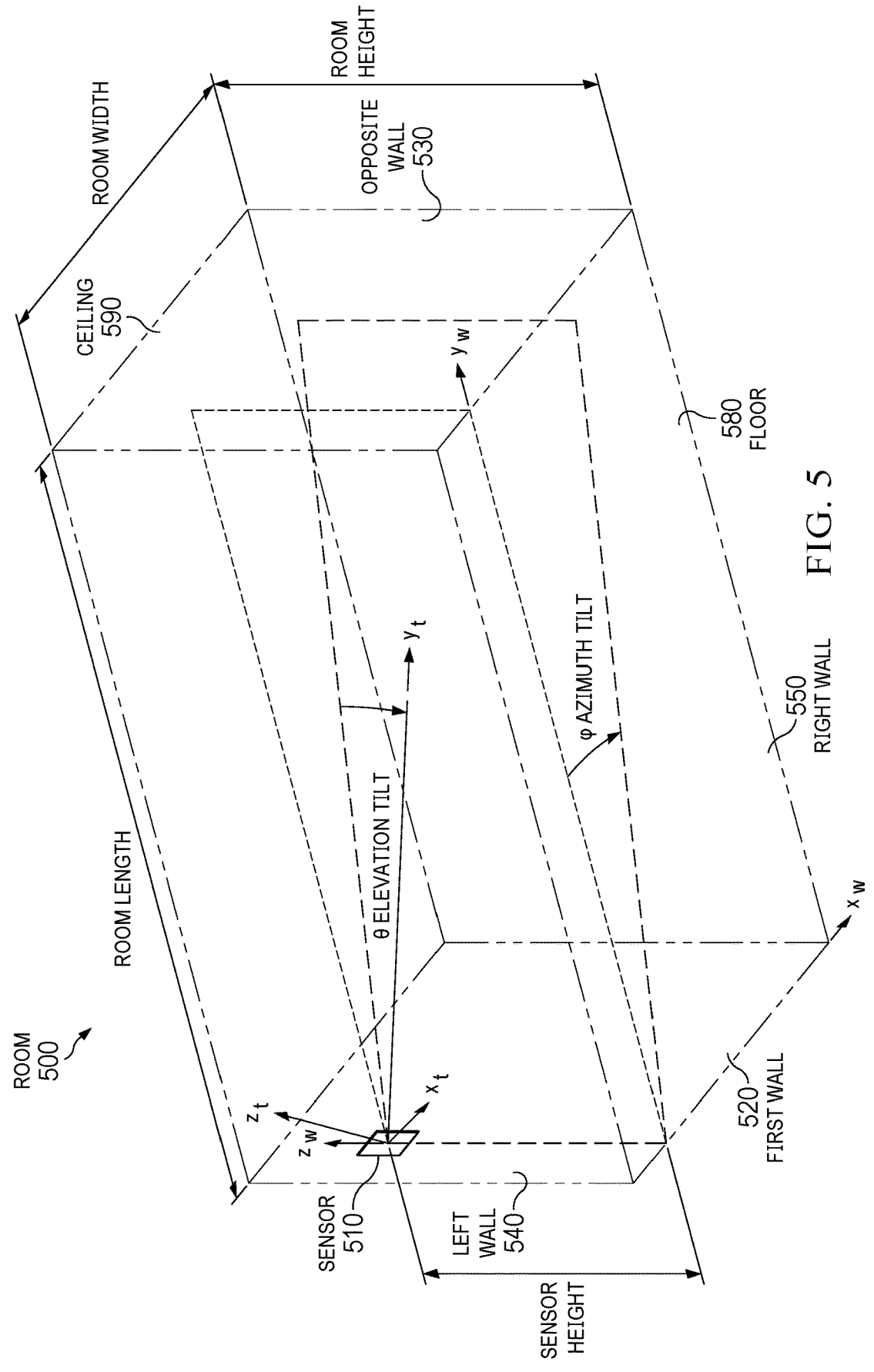
FIG. 5 is a diagram of a sensor mounted on a wall at an angle according to some aspects of the present disclosure.

FIG. 5 is a diagram of a sensor 510 mounted on a wall 520 at an angle according to some aspects of the present disclosure. As shown in FIG. 5, room 500 includes first wall 520 on which sensor 510 is mounted, opposite wall 530, left wall 540, right wall 550, and ceiling 590. Sensor 510 is mounted on first wall 520 just below ceiling 590 near right wall 550. In examples in which sensor 510 is mounted in the corner of room 500 at an oblique azimuth angle, it may be especially important to accurately determine the orientation of sensor 510.

In the example shown in FIG. 5, sensor 510 is mounted at an angle represented as elevation tilt $\theta$, relative to horizontal, and azimuth tilt $\varphi$, relative to the planes of left and right walls 540 and 550. Although not shown in FIG. 5, the orientation of sensor 510 may include a third angle, analogous to the roll of an airplane, where the elevation tilt $\theta$ is analogous to the pitch of the airplane, and the azimuth tilt $\varphi$ is analogous to yaw of the airplane. In some examples, sensor 510 includes a built-in component for detecting the direction of gravity (e.g., a level) and/or detecting the direction of magnetic north (e.g., a compass).

FIG. 5 shows two coordinate systems: the world space W and the tracker space T. The world space W includes three axes $x_w$, $y_w$, and $z_w$. The horizontal axis $x_w$ is parallel to walls 520 and 530, and the horizontal axis $y_w$ is parallel to walls 540 and 550. The vertical axis $z_w$ is orthogonal to floor 580 and ceiling 590. The three orthogonal axes $x_t$, $y_t$, and $z_t$ of the tracker space T are based on the orientation of sensor 510. The tracker axis $y_t$ is aligned with the boresight or lens of sensor 510, and the tracker axes $x_t$ and $z_t$ are orthogonal to the axis $y_t$.

If sensor 510 senses a person touching a point on right wall 550, sensor 510 can determine that point on right wall 550. However, sensor 510 may not have sufficient information to determine the entire extent of right wall 550 because sensor 510 does not have information on the angle of right wall 550 relative to the orientation of sensor 510. Sensor 510 could assume that right wall 550 is parallel to the boresight of sensor 510, but that assumption is incorrect in the example of FIG. 5 where azimuth tilt $\varphi$ is nonzero. In other words, where the azimuth tilt $\varphi$ or elevation tilt $\theta$ is nonzero, at least one of the axes of the tracker space T will not be aligned with the axes of the world space W.

To assist sensor 510 in determining the determining the elevation tilt $\theta$ and the azimuth tilt $\varphi$, a person can move along a line that is parallel to one of walls 520, 530, 540, and 550 during a user-assisted, semi-automatic calibration procedure. Sensor 510 may be configured to initiate the calibration procedure after receiving user input. The movement sensed by sensor 510 during the calibration procedure can be used to determine the elevation tilt $\theta$ and the azimuth tilt $\varphi$ of sensor 510.

Figure 6A:
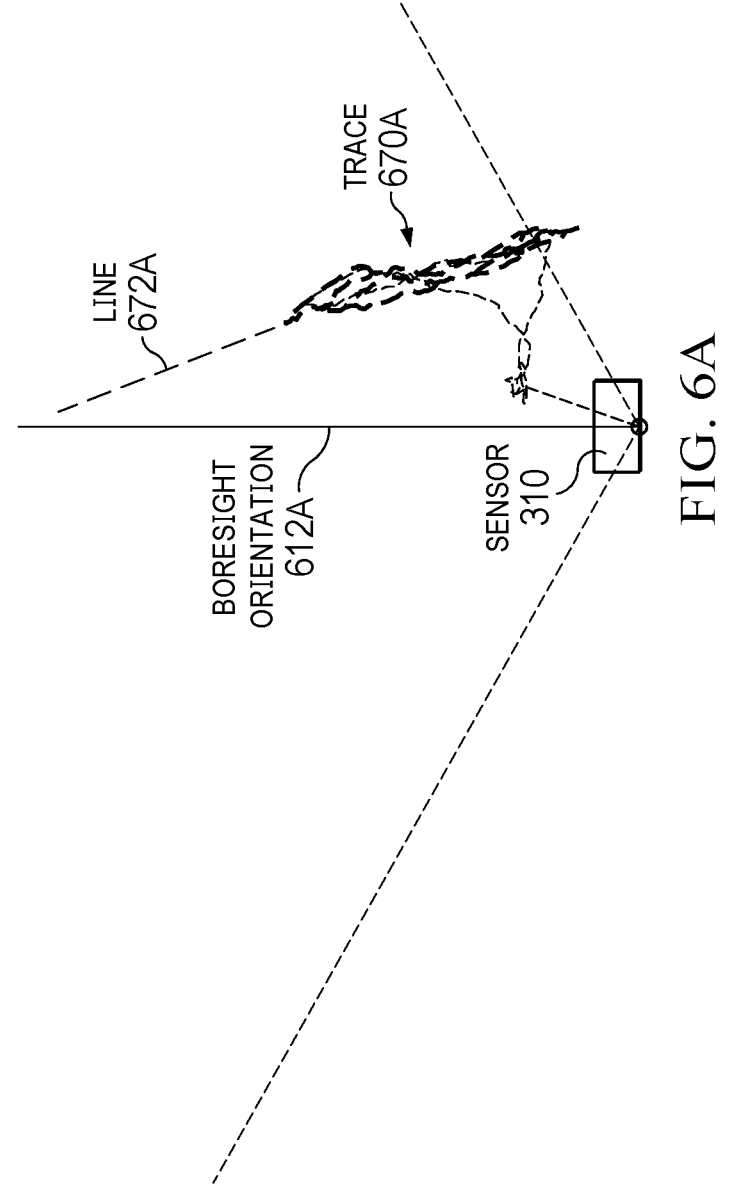
FIGS. 6A and 6B are diagrams of a trace representing the movement of a person along a line parallel to a wall according to some aspects of the present disclosure.
Figure 6B:
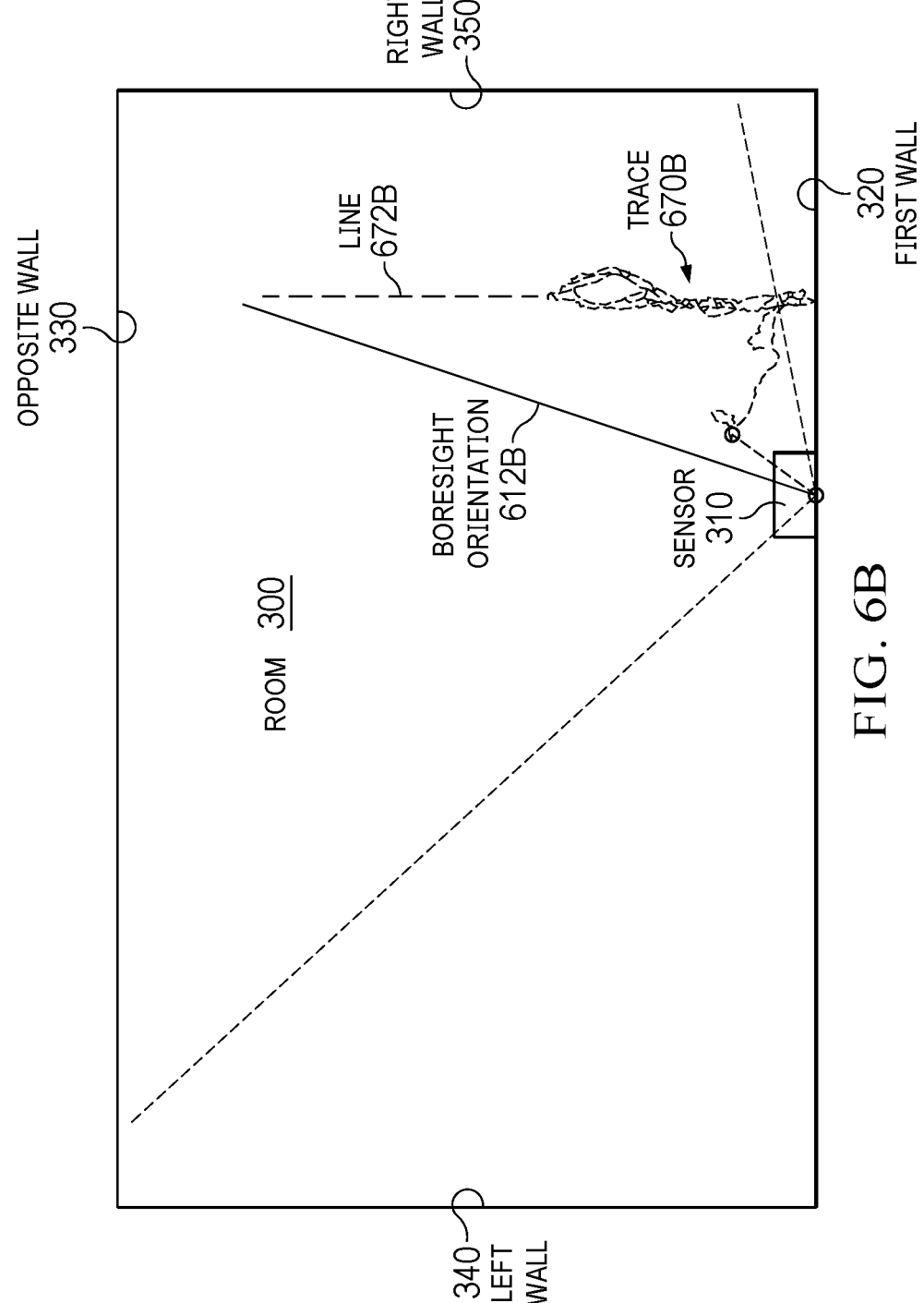

FIGS. 6A and 6B are diagrams of a trace 670A and 670B representing the movement of a person along a line 672A and 672B parallel to a wall according to some aspects of the present disclosure. Room 300 is shown in FIGS. 6A, 6B, 7A, and 7B because sensor 310 may be configured to perform a user-assisted calibration procedure as well as perform the user-assisted wall detection procedure shown in FIG. 3. Alternatively, a user-assisted calibration procedure described herein may be used in a sensor that is not configured to perform a user-assisted wall detection procedure.

Traces 670A and 670B represent the movement of a person during the sensing phase of a calibration procedure implemented by a sensor. The calibration procedure can be initiated by the person providing user input to sensor 310. The calibration procedure can be ended by the person providing user input to sensor 310. Additionally or alternatively, the calibration procedure can be ended by a timer expiring or reaching a threshold value, where sensor 310 may start the timer at the start of the calibration procedure. The conclusion of traces 670A and 670B may coincide with the receipt of a second user input or with the expiration of a timer. Sensor 310 may determine the angle of sensor 310 as the data for traces 670A and 670B is received (e.g., in real time), or sensor 310 may make this determination after the calibration procedure has concluded.

Sensor 310 may be configured to store a room coordinate transformation matrix $R_E$. Initially, the matrix $R_E$ (shown below in Equation (1)) may include only the elevation tilt angle $\theta$, assuming that elevation tilt is fixed and known. Initially, the azimuth tilt may be set to zero.

$$R_E = \begin{bmatrix} 1 & 0 & 0 \\ 0 & \cos(\theta) & \sin(\theta) \\ 0 & -\sin(\theta) & \cos(\theta) \end{bmatrix} \quad (1)$$

After providing user input to sensor 310, the person moves through the room in parallel to a wall. In examples in which the room has a rectangular shape, the person can move parallel or perpendicular to any of the walls. The person can walk along a wall, or away from the wall in an unobstructed straight path that is parallel to the wall. In the example shown in FIG. 6A, line 672A is not parallel or perpendicular to boresight orientation 612A. Sensor 310 may be configured to determine the angle of line 672A relative to boresight orientation 612A using a linear fitting to the x-y coordinates of trace 670A. Sensor 310 may be configured to then calculate the transformation matrix $R_{AE}$ (shown below in Equation (2)) to include the estimated azimuth tilt $\varphi$. Sensor 310 can use this determined angle for later determining the room boundaries and for other object detection procedures.

$$R_{AE} = R_A R_E = \begin{bmatrix} \cos(\varphi) & \cos(\theta)\sin(\varphi) & \sin(\theta)\sin(\varphi) \\ -\sin(\varphi) & \cos(\theta)\cos(\varphi) & \sin(\theta)\cos(\varphi) \\ 0 & -\sin(\theta) & \cos(\theta) \end{bmatrix} \quad (2)$$

$$R_A = \begin{bmatrix} \cos(\varphi) & \sin(\varphi) & 0 \\ -\sin(\varphi) & \cos(\varphi) & 0 \\ 0 & 0 & 1 \end{bmatrix} \quad (3)$$

The coordinates of the tracking space T can be converted to coordinates in the world space W, using Equation (4), where H represents the height of sensor 310 above the floor.

$$\begin{bmatrix} x_w \\ y_w \\ z_w \end{bmatrix} = R \begin{bmatrix} x_t \\ y_t \\ z_t \end{bmatrix} + \begin{bmatrix} 0 \\ 0 \\ H \end{bmatrix} \quad (4)$$

FIG. 6B shows boresight orientation 612B, trace 670B, and line 672B rotated relative to sensor 310. The rotation of FIG. 6B relative to FIG. 6A is equal to the determined angle of line 672A relative to boresight orientation 612A. As shown in FIG. 6B, trace 670B and line 672B are oriented in a direction that is parallel to walls 340 and 350, while boresight orientation 612B is oriented at an angle relative to that direction. When sensor 310 is determining the location of walls 320, 330, 340, and 350, sensor 310 can use the orientation of lines 672A and 672B to determine the orientation of walls 320, 330, 340, and 350, based on the assumption that the room has a rectangular shape.

Sensor 310 may be capable of detecting traces 670A and 670B with higher accuracy than walls 320, 330, 340, and 350 in room 300 because sensor 310 is better at detecting moving objects than stationary objects. Therefore, traces 670A and 670B may provide a more accurate representation of the orientation of walls 320, 330, 340, and 350 than the static point cloud generated by sensor 310.

Figure 7A:
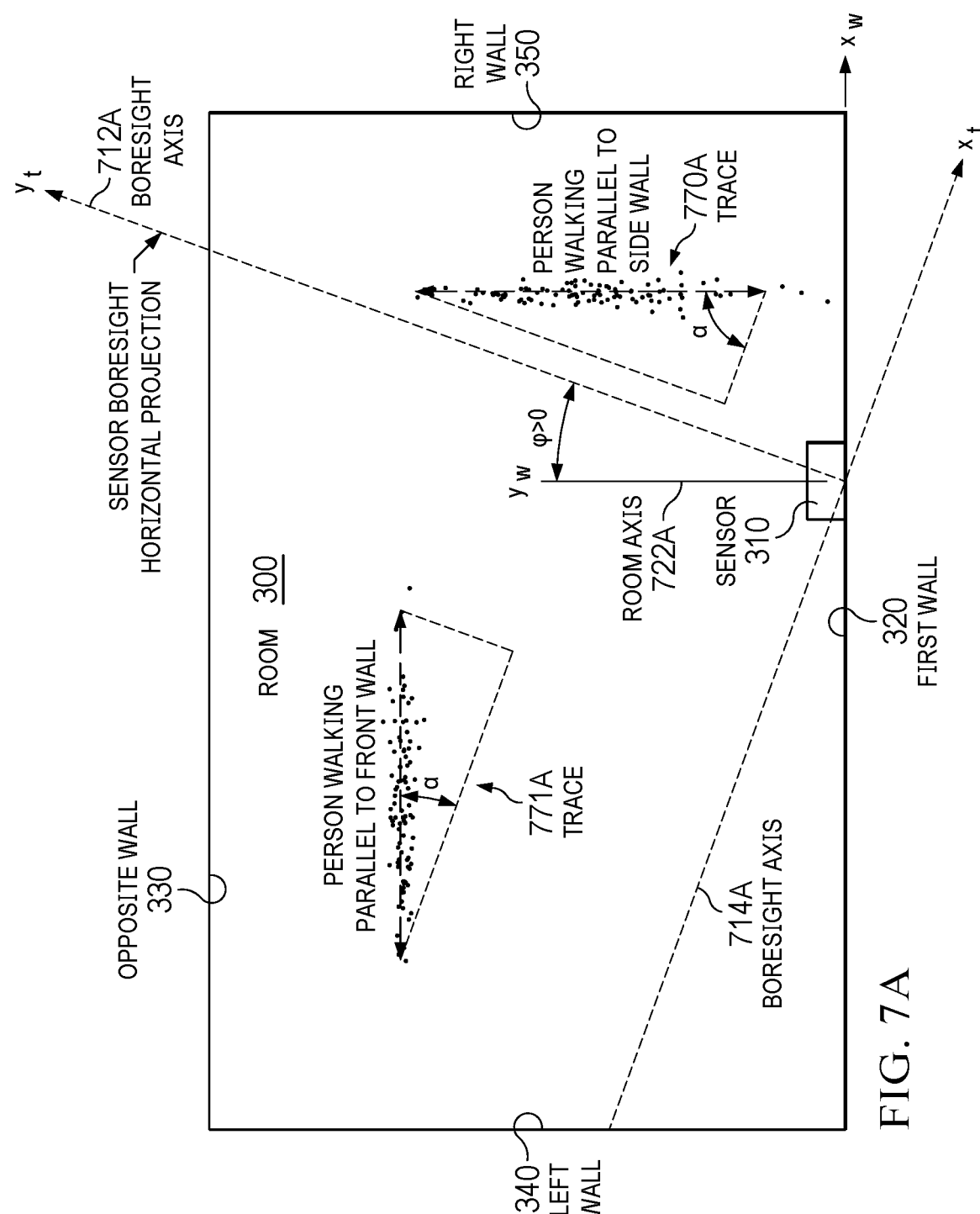
FIGS. 7A and 7B are diagrams of traces representing the movement of a person along lines parallel to walls according to some aspects of the present disclosure.
Figure 7B:
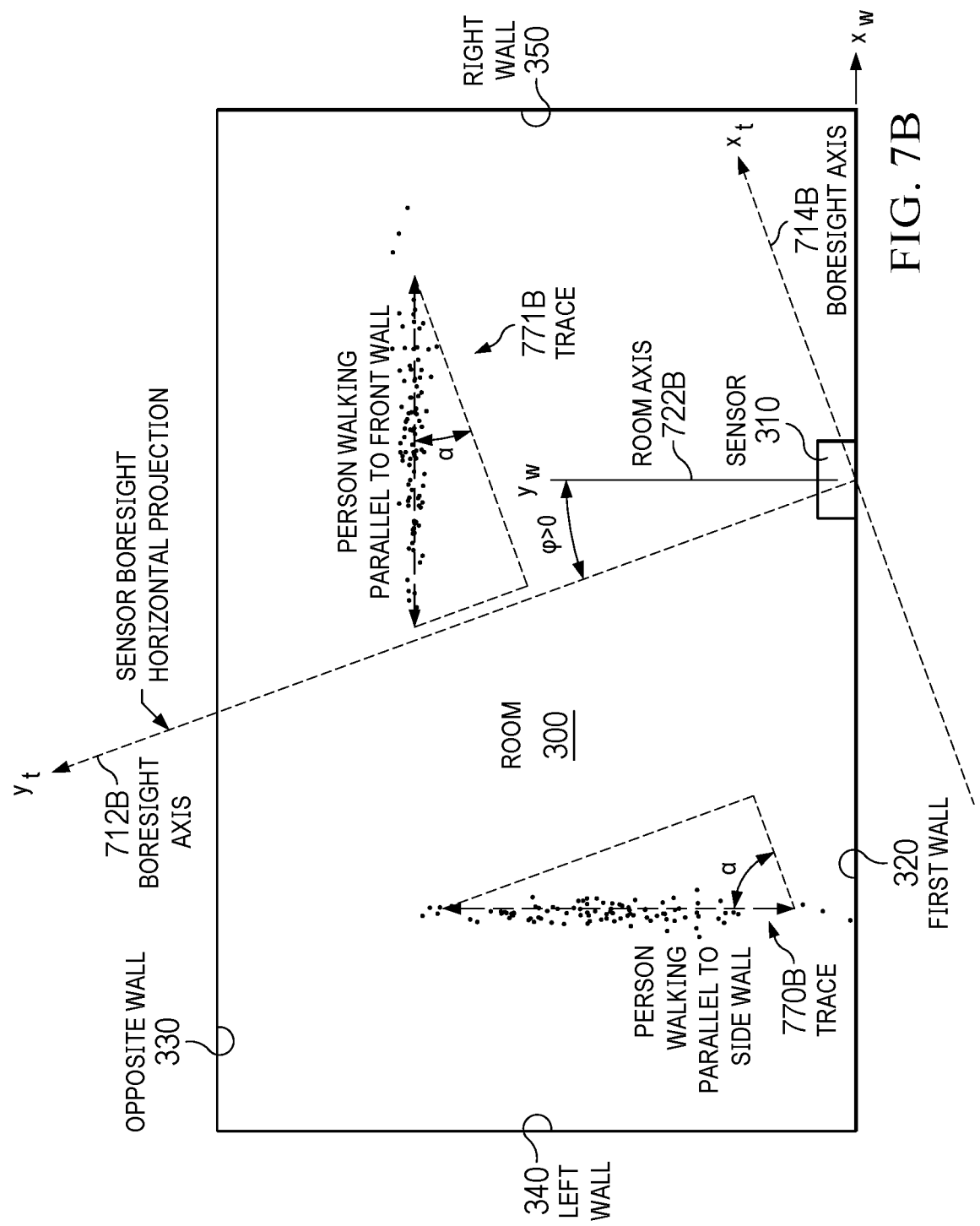

FIGS. 7A and 7B are diagrams of traces 770A, 771A, 770B, and 771B representing the movement of a person along lines parallel to walls 320, 330, 340, and 350 according to some aspects of the present disclosure. Traces 770A, 771A, 770B, and 771B represent the movement of a person during the sensing phase of a calibration procedure implemented by a sensor. The person can walk back and forth parallel to walls 340 and 350, and this movement is represented by traces 770A and 770B. Additionally or alternatively, the person can walk back and forth parallel to walls 320 and 330, and this movement is represented by traces 771A and 771B.

Sensor 310 may be configured to estimate either of the angles labeled as α in FIG. 7A or 7B using linear interpolation and/or smoothing to generate a linear fit for a set of trace points representing the movement of the person. Sensor 310 can use Equation (5) to determine the azimuth tilt angle φ of sensor 310 based on the assumption that an absolute value of the angle φ is less than or equal to forty-five degrees. In the examples shown in FIGS. 7A and 7B, the azimuth tilt angle φ is the angle between boresight axis 712A or 712B and the linear fit of trace 770A, 771A, 770B, or 771B. FIG. 7A shows an example in which the azimuth tilt angle φ is greater than zero. FIG. 7B shows an example in which the azimuth tilt angle φ is less than zero.

$$\varphi = \begin{cases} \alpha + 90°, & -90° < \alpha < -45° \\ \alpha, & -45° \leq \alpha \leq 45° \\ \alpha + 90°, & 45° < \alpha < 90° \end{cases} \quad (5)$$

Figure 8:
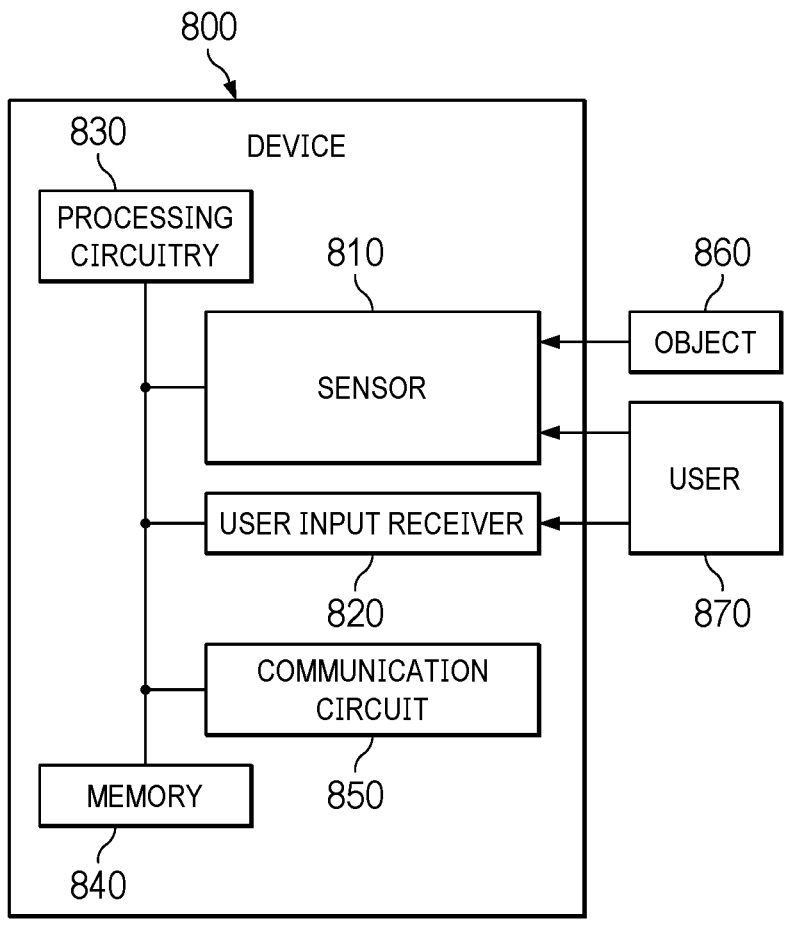
FIG. 8 is a conceptual block diagram of a device including a sensor and processing circuitry according to some aspects of the present disclosure.

FIG. 8 is a conceptual block diagram of a device 800 including a sensor 810 and processing circuitry 830 according to some aspects of the present disclosure. In the example shown in FIG. 8, device 800 includes sensor 810, user input receiver 820, processing circuitry 830, memory 840, and communication circuit 850. Device 800 may be configured as or be part of a motion sensor, an occupancy sensor, a smoke detector, a carbon monoxide detector, a smart home hub, a smart speaker, an exhaust fan, a security sensor, a ceiling fan, an electrical outlet, any other internet of things device, or any other electronic device. Device 800 may be configured to mount on a wall or ceiling of a room. Additionally or alternatively, device 800 may be configured to rest on a table or the ground, or device 800 may be a mobile device that is held by a user.

Sensor 810 may include a continuous wave radar sensor, a pulsed radar sensor, a lidar sensor, an ultrasonic sensor, a visual light camera, an infrared camera, a microphone, and/or any other type of sensor. In examples in which sensor 810 includes a radar, the radar may be a low-resolution internet-of-things radar sensor including one or more (e.g., three) transmitter channels and one or more (e.g., four) receiver channels. The techniques of this disclosure may be implemented by a low-resolution radar to achieve wall-detection accuracy on par with a more expensive multiple-input multiple-output phased array radar. Additional example details of radar sensors can be found in commonly assigned U.S. Patent Application Publication No. 2018/0279884, entitled "Multi-Person Vital Signs Monitoring Using Millimeter Wave (mm-Wave) Signals," filed on Sep. 27, 2017, and U.S. patent application Ser. No. 17/388,954, entitled "Method and Apparatus for Low Power Motion Detection," filed on Jul. 29, 2021, each of which is incorporated by reference in its entirety.

User input receiver 820 is configured to receive input from user 870. Input from user 870 can take the form of user 870 pressing a button on device 800, pressing a button on a remote device (e.g., a remote control or a mobile device), interacting with an application running on a computing device, voice input, a gesture in the field of view of user input receiver 820, and so on. User input receiver 820 may include a radar, camera, motion sensor, microphone, tactile input (e.g., button or touchscreen), wireless or wired transceiver, and/or any other type of receiver. In some examples, sensor 810 and/or communication circuit 850 is configured to receive input from user 870, and device 800 does not include a separate user input receiver 820.

Processing circuitry 830 may be configured to determine the location of object 860 and user 870 based on signals received by sensor 810. To determine the location and velocity of a moving object, for example, processing circuitry 830 may be configured to apply a Kalman filter and/or a tracking algorithm (e.g., multiple-hypothesis tracking) to the signals received by sensor 810.

Processing circuitry 830 may be configured to also perform the user-assisted calibration procedure described with respect to FIGS. 5 and 6. Processing circuitry 830 may be configured to perform the user-assisted wall-detection procedure described with respect to FIG. 3. Alternatively, the calibration procedure and/or the wall-detection procedure may be performed by processing circuitry that is remote from device 800. In such examples, communication circuit 850 can send, to the remote processing circuitry, data indicating the signals received by sensor 810. For example, the remote processing circuitry may be configured to receive the user input directly (e.g., via a button or a touchscreen on the remote device) or indirectly (e.g., from device 800).

Processing circuitry 830 can determine that device 800 has received user input based on a signal from user input receiver 820. In examples in which the user input is a spoken word or phrase, processing circuitry 830 can implement voice recognition techniques to match the audio received by user input receiver 820 to a template associated with a particular word or phrase. Additionally or alternatively, processing circuitry 830 may be configured to determining that device 800 has received user input based on signals from sensor 810 indicating that user 870 made a particular gesture.

In some examples, processing circuitry 830 includes a timer. Processing circuitry 830 may be configured to set the timer in response to receiving user input from user 870 via sensor 810 or user input receiver 820. Processing circuitry 830 may set the timer at the beginning of a user-assisted wall-detection procedure and/or at the beginning of a user-assisted calibration procedure. Processing circuitry 830 can end the sensing phase of the user-assisted procedure in response to determining that the timer has reached a threshold value.

Memory 840 may be configured to store data relating to the locations and velocities of object 860 and user 870. In addition, memory 840 can store instructions that, when executed by processing circuitry 830, cause processing circuitry 830 to implement a wall-detection procedure and/or a calibration procedure.

Communication circuit 850 may be configured to transmit and receive data with other electronic devices using Wi-Fi, Bluetooth, Zigbee, ethernet, or another type of communication. Communication circuit 850 can transmit data indicating the signals received by sensor 810, objects detected by processing circuitry 830, and/or the outputs of a calibration procedure or a wall-detection procedure. In some examples, device 800 may also include an output for communicating to user 870 that device 800 is in a sensing phase of a calibration procedure or a wall-detection procedure. The output may be a light or speaker that communicates to user 870 whether or not the sensing phase is currently occurring.

FIG. 9 is a flow diagram of a method 900 for determining room boundary locations according to some aspects of the present disclosure. Some processes of the method 900 may be performed in orders other than described, and many processes may be performed concurrently in parallel. Furthermore, processes of the method 900 may be omitted or substituted in some examples of the present disclosure. The method 900 is described with reference to sensor 410 shown in FIG. 4, although other components such as sensors 110, 210, 310, 412, 510, and 810 and electronic devices 414, 416, 418A, and 418B shown in FIGS. 1-5 and 8 may exemplify similar techniques.

Referring to block 910, sensor 410 receives first user input from user 470. Sensor 410 can sense stationary objects and movements in room 400 before receiving the first user input, but sensor 410 may initiate a user-assisted wall-detection procedure in response to receiving the first user input. Before receiving the first user input, sensor 410 may have generated a static point cloud based on returns from the stationary objects in room 400.

Sensor 410 may receive the first user input directly from user 470, or sensor 410 may receive the first user input from sensor 412 or one of electronic devices 414, 416, 418A, and 418B via a wired or wireless connection. In response to receiving the first user input, sensor 410 may be configured to activate a light or speaker, or cause device 416, 418A, or 418B to output a graphical user interface (GUI), indicating that sensor 410 is in a sensing phase of the wall-detection procedure.

Referring to block 920, sensor 410 senses movement of user 470 in room 400. The sensed movement may include user 470 moving to and touching at least one wall in room 400. As discussed in further detail above, sensor 410 may have better accuracy in sensing the movements of user 470, including the small movements of an arm or hand, as compared to sensing the stationary objects in room 400. Sensor 410 may be configured to store the sensed movements of user 470 during the user-assisted wall-detection procedure (e.g., after receiving the first user input) for use in blocks 940 and 950.

Referring to optional block 930, sensor 410 receives second user input from user 470. Sensor 410 may be configured to end the sensing phase of the user-assisted wall-detection procedure in response to receiving the second user input. Alternatively, sensor 410 can end the sensing phase in response to a predetermined time duration having elapsed since the first user input was received. As another alternative, sensor 410 can end the sensing phase in response to a predetermined time duration having elapsed since movement was last sensed in room 400. In response to receiving the second user input, sensor 410 may be configured to deactivate the light, speaker, or GUI, indicating that sensor 410 is no longer in the sensing phase.

Referring to block 940, sensor 410 determines an estimated location of a first wall in room 400 based on the sensed movement of user 470 after receiving the first user input. Referring to optional block 950, sensor 410 determines an estimated location of a second wall in room 400 based on the sensed movement of user 470 after receiving the first user input. Sensor 410 may be configured to use both the sensed movements of user 470 and a static point cloud of data to determine the estimated location(s) of one or more walls in room 400. Sensor 410 can make these determinations during the sensing phase or after the sensing phase has concluded.

Sensor 410 can determine a location on the first wall based on the sensed movement of user 470. Sensor 410 can then determine the extent of the first wall based on a known or estimated orientation of sensor 410 relative to the plane of the first wall. For example, sensor 410 may assume that the first wall is parallel or perpendicular to the boresight of sensor 410. As an alternative, sensor 410 perform a separate user-assisted calibration procedure to determine the orientation of the first wall relative to the boresight of sensor 410.

FIG. 10 is a flow diagram of a method 1000 of determining the orientation of a sensor according to some aspects of the present disclosure. Some processes of the method 1000 may be performed in orders other than described, and many processes may be performed concurrently in parallel. Furthermore, processes of the method 1000 may be omitted or substituted in some examples of the present disclosure. The method 1000 is described with reference to sensor 510 shown in FIG. 5, although other components such as sensors 110, 210, 310, 410 412, and 810 and electronic devices 414, 416, 418A, and 418B shown in FIGS. 1-4 and 8 may exemplify similar techniques.

Referring to block 1010, sensor 510 receives first user input. Sensor 510 can sense movements in room 500 before receiving the first user input, but the first user input received by sensor 510 may initiate a user-assisted calibration procedure. Sensor 510 may receive the first user input directly from a user, or sensor 510 may receive the first user input from another device via a wired or wireless connection. In response to receiving the first user input, sensor 510 may be configured to activate a light or speaker, or cause a remote device to output a GUI, indicating that sensor 510 is in a sensing phase of the calibration procedure. The light, sound, or GUI associated with the calibration procedure may be different from the light, sound, or GUI associated with the wall-detection procedure. For example, sensor 510 may activate a green light for the calibration procedure and a red light for the wall-detection procedure.

Referring to block 1020, sensor 510 senses movement of a user in room 500. Sensor 510 can transmit signals and receive the signals after reflecting off user 570. As discussed in further detail above, sensor 510 may have better accuracy in sensing the movements of the user, as compared to sensing the stationary objects in room 500. Sensor 510 may be configured to store the sensed movements of the user during the user-assisted calibration procedure (e.g., after receiving the first user input) for use in block 1040.

Referring to optional block 1030, sensor 510 receives second user input. Sensor 510 may be configured to end the sensing phase of the user-assisted calibration procedure in response to receiving the second user input. Alternatively, sensor 510 can end the sensing phase in response to a predetermined time duration having elapsed since the first user input was received. As another alternative, sensor 510 can end the sensing phase in response to a predetermined time duration having elapsed since movement was last sensed in room 500. In response to receiving the second user input, sensor 510 may be configured to deactivate the light, speaker, or GUI, indicating that sensor 510 is no longer in the sensing phase.

Referring to block 1040, sensor 510 determines an estimated tilt angle of sensor 510 based on the sensed movement of the user after receiving the first user input. Sensor 510 can make this determination during the sensing phase or after the sensing phase has concluded. In other words, the determination phase of the calibration procedure may occur simultaneous with, or after, the sensing phase of the calibration procedure. Sensor 510 can fit a line to the movement of the user during the sensing phase. Sensor 510 may be configured to determine that the plane(s) of one or more walls in room 500 is/are parallel to the fitted line. In some examples, sensor 510 can also use a built-in level and/or compass to determine the estimated tilt angle.

After determining the estimated tilt angle, sensor 510 may be configured to use the estimated tilt angle in determining an estimated location of a wall or an object in room 500. The angle determination may improve the accuracy of room boundaries estimates by sensor 510. Even though sensor 510 is described as making these determinations, sensor 510 may be configured to send data about the sensed movements of a user in room 500 to another device, so that the other device can determine the estimated tilt angle of sensor 510.

A sensor may be configured to implement methods 900 and 1000 shown in FIGS. 9 and 10 as a single, combined method. For example, the sensor can begin a first sensing phase for a calibration procedure in response to receiving a first user input. In response to receiving a second user input, the sensor can end the first sensing phase and begin a second sensing phase for a wall-detection procedure. The sensor can end the second sensing phase in response to receiving a third user input.

The following numbered aspects demonstrate one or more aspects of the disclosure.

Aspect 1. A method includes receiving a first user input at processing circuitry. The method also includes determining, by the processing circuitry based on a signal from a radar sensor, movement of a user in a room after receiving the first user input. In addition, the method includes determining, by the processing circuitry, a first estimated location of a first wall in the room based on a first portion of the movement of the user. The method further includes determining, by the processing circuitry, a second estimated location of a second wall in the room based on a second portion of the movement of the user.

Aspect 2. The method of the preceding aspect, further including generating a static point cloud of non-moving objects in the room.

Aspect 3. The method of the preceding aspect, further including determining a third estimated location of the first wall based on the static point cloud.

Aspect 4. The method of the preceding aspect, further including determining a combined estimated location of the first wall based on the first and third estimated locations of the first wall.

Aspect 5. The method of the preceding aspects or any combination thereof, further including receiving a second user input.

Aspect 6. The method of the preceding aspect, wherein determining the movement of the user comprises determining the movement of the user after receiving the first user input and before receiving the second user input.

Aspect 7. The method of the preceding aspects or any combination thereof, further including activating a light in response to receiving the first user input.

Aspect 8. The method of the preceding aspects or any combination thereof, further including deactivating a light in response to receiving the second user input.

Aspect 9. The method of the preceding aspects or any combination thereof, further including presenting a graphical user interface via a mobile device in response to receiving the first user input.

Aspect 10. The method of the preceding aspects or any combination thereof, further including setting a timer in response to receiving the first user input.

Aspect 11. The method of the preceding aspect, further including determining that the timer has reached a threshold value after setting the timer.

Aspect 12. The method of the preceding aspects or any combination thereof, wherein determining the movement of the user comprises determining the movement of the user after receiving the first user input and before determining that a timer has reached the threshold value.

Aspect 13. The method of the preceding aspects or any combination thereof, wherein the movement of the user comprises the user touching the first wall.

Aspect 14. The method of the preceding aspects or any combination thereof, further including determining an estimated tilt angle of the radar sensor based on a second movement of the user after receiving a third user input.

Aspect 15. The method of the preceding aspect, further including determining the movement of the user based on signals received by the radar sensor.

Aspect 16. The method of either of the two preceding aspects, wherein the second movement of the user comprises the user walking parallel to the first wall.

Aspect 17. The method of the three preceding aspects or any combination thereof, wherein determining the first estimated location of the first wall is based on the movement of the user and further based on the estimated tilt angle.

Aspect 18. The method of the preceding aspects or any combination thereof, further including sensing movement of the user by at least transmitting a radar signal and receiving a reflection of the radar signal from the user, wherein determining the first estimated location is based on the reflection of the radar signal.

Aspect 19. The method of the preceding aspects or any combination thereof, wherein receiving the first user input transmitting a second signal, receiving a reflection of the second signal from the user, and determining, based on the reflection, that the user made a gesture.

Aspect 20. The method of the preceding aspects or any combination thereof, wherein receiving the first user input comprises receiving a second signal from a mobile electronic device.

Aspect 21. The method of the preceding aspects or any combination thereof, further including, in response to receiving the first user input, outputting an audible signal instructing the user to touch the first wall.

Aspect 22. The method of the preceding aspects or any combination thereof, further including, in response to receiving the first user input, causing a mobile device to present a graphical user interface instructing the user to touch the first wall.

Aspect 23. A method includes receiving a first user input at processing circuitry. The method also includes determining, by the processing circuitry based on a signal from a radar sensor, movement of a user in a room after receiving the first user input. In addition, the method includes determining, by the processing circuitry, an estimated tilt angle of the radar sensor based on the movement of the user after receiving the first user input.

Aspect 24. The method of the preceding aspect, wherein the movement of the user comprises the user walking parallel to a wall in the room.

Aspect 25. The method of either of the two preceding aspects, further including the method of aspects 1-22 or any combination thereof.

Aspect 26. A device includes a radar sensor configured to sense movement of a user in a room. The device also includes processing circuitry configured to receive a first user input and determine, based on a signal from the radar sensor, the movement of the user in the room after receiving the first user input. In addition, the processing circuitry is configured to determine a first estimated location of a first wall in the room based on a first portion of the movement of the user. The processing circuitry is also configured to determine a second estimated location of a second wall in the room based on a second portion of the movement of the user.

Aspect 27. A device includes a radar sensor configured to sense movement of a user in a room. The device also includes processing circuitry configured to receive a first user input and determine, based on a signal from the radar sensor, the movement of the user in the room after receiving the first user input. In addition, the processing circuitry is configured to determine a first estimated location of a first wall in the room based on a first portion of the movement of the user. The processing circuitry is also configured to determine an estimated tilt angle of the radar sensor based on the movement of the user after receiving the first user input.

Aspect 28. The device of either of the two preceding aspects, wherein the processing circuitry is configured to perform the method of aspects 1-25 or any combination thereof.

Aspect 29. A non-transitory computer-readable medium has executable instructions stored thereon, configured to be executable by processing circuitry for causing the processing circuitry to receive a first user input and determine, based on a signal from a radar receiver, movement of a user in a room after receiving the first user input. In addition, the instructions are configured to be executable by the processing circuitry for further causing the processing circuitry to determine a first estimated location of a first wall in the room based on a first portion of the movement of the user. The instructions are also configured to be executable by the processing circuitry for further causing the processing circuitry to determine a second estimated location of a second wall in the room based on a second portion of the movement of the user.

Aspect 30. A non-transitory computer-readable medium has executable instructions stored thereon, configured to be executable by processing circuitry for causing the processing circuitry to receive a first user input and determine, based on a signal from a radar receiver, movement of a user in a room after receiving the first user input. In addition, the instructions are configured to be executable by the processing circuitry for further causing the processing circuitry to determine a first estimated location of a first wall in the room based on a first portion of the movement of the user. The instructions are also configured to be executable by the processing circuitry for further causing the processing circuitry to determine an estimated tilt angle of the radar sensor based on the movement of the user after receiving the first user input.

Aspect 31. The non-transitory computer-readable medium of either of the two preceding aspects, wherein the instructions are configured to be executable by the processing circuitry for further causing the processing circuitry to perform the method of aspects 1-25 or any combination thereof.

Aspect 32. A system includes means for receiving a first user input and means for determining, based on a signal from a radar sensor, movement of a user in a room after receiving the first user input. In addition, the system includes means for determining a first estimated location of a first wall in the room based on a first portion of the movement of the user. The system also includes means for determining a second estimated location of a second wall in the room based on a second portion of the movement of the user.

Aspect 33. A system includes means for receiving a first user input and means for determining, based on a signal from a radar sensor, movement of a user in a room after receiving the first user input. In addition, the system includes means for determining a first estimated location of a first wall in the room based on a first portion of the movement of the user. The system also includes means for determining an estimated tilt angle of the radar sensor based on the movement of the user after receiving the first user input.

Aspect 34. The system of either of the two preceding aspects, further including means for performing the method of aspects 1-25 or any combination thereof.

This disclosure has attributed functionality to sensors 110, 210, 310, 410, 412, 510, and 810, electronic devices 414, 416, 418A, and 418B, receiver 820, processing circuitry 830, and communication circuit 850. Sensors 110, 210, 310, 410, 412, 510, and 810, electronic devices 414, 416, 418A, and 4186, receiver 820, processing circuitry 830, and communication circuit 850 may include one or more processors. Sensors 110, 210, 310, 410, 412, 510, and 810, electronic devices 414, 416, 418A, and 418B, receiver 820, processing circuitry 830, and communication circuit 850 may include any combination of integrated circuitry, discrete logic circuitry, analog circuitry, such as one or more microprocessors, microcontrollers, digital signal processors, application specific integrated circuits, central processing units, graphics processing units, field-programmable gate arrays, and/or any other processing resources.

In some examples, sensors 110, 210, 310, 410, 412, 510, and 810, electronic devices 414, 416, 418A, and 418B, receiver 820, processing circuitry 830, and communication circuit 850 include multiple components, such as any combination of the processing resources listed above, as well as other discrete or integrated logic circuitry, and/or analog circuitry. Additionally or alternatively, sensors 110, 210, 310, 410, 412, 510, and 810 may be communicatively coupled to one or more remote processors that include any of the above circuitry.

The techniques described in this disclosure may also be embodied or encoded in an article of manufacture including a non-transitory computer-readable storage medium, such as memory 840. Example non-transitory computer-readable storage media may include random access memory (RAM), read-only memory (ROM), programmable ROM, erasable programmable ROM, electronically erasable programmable ROM, flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

It is understood that the present disclosure provides a number of exemplary embodiments and that modifications are possible to these embodiments. Such modifications are expressly within the scope of this disclosure. Furthermore, application of these teachings to other environments, applications, and/or purposes is consistent with and contemplated by the present disclosure.

What is claimed is:

1. A method comprising:
receiving, by processing circuitry, a first user input;
determining, by the processing circuitry based on a signal from a radar sensor, movement of a user in a room after receiving the first user input;
determining, by the processing circuitry, a first estimated location of a first wall in the room based on a first portion of the movement of the user;
determining, by the processing circuitry, a second estimated location of a second wall in the room based on a second portion of the movement of the user;
generating a static point cloud of non-moving objects in the room;
modifying at least one of the first estimated location and the second estimated location using the static point cloud; and
modifying the static point cloud based on the movement of the user.

2. The method of claim 1, wherein the modifying includes:
determining a third estimated location of the first wall based on the static point cloud; and
determining a combined estimated location of the first wall based on the first and third estimated locations of the first wall.

3. The method of claim 1, further comprising receiving a second user input, wherein determining the movement of the user comprises determining the movement of the user after receiving the first user input and before receiving the second user input.

4. The method of claim 3, further comprising:
activating a light in response to receiving the first user input; and
deactivating the light in response to receiving the second user input.

5. The method of claim 1, further comprising:
setting a timer in response to receiving the first user input; and
determining that the timer has reached a threshold value after setting the timer,
wherein determining the movement of the user comprises determining the movement of the user after receiving the first user input and before determining that the timer has reached the threshold value.

6. The method of claim 1, wherein the movement of the user comprises the user touching the first wall.

7. The method of claim 1, wherein the movement is a first movement, the method further comprising:
determining the first movement of the user based on signals received by the radar sensor;
receiving a third user input; and
determining an estimated tilt angle of the radar sensor based on a second movement of the user after receiving the third user input.

8. The method of claim 7, wherein the second movement of the user comprises the user walking parallel to the first wall.

9. The method of claim 7, wherein determining the first estimated location of the first wall is based on the first movement of the user and further based on the estimated tilt angle.

10. The method of claim 1, further comprising sensing the movement of the user by at least:
transmitting a radar signal; and
receiving a reflection of the radar signal from the user,
wherein determining the first estimated location is based on the reflection of the radar signal.

11. The method of claim 1, wherein receiving the first user input comprises:
transmitting a second signal;
receiving a reflection of the second signal from the user; and
determining, based on the reflection, that the user made a gesture.

12. The method of claim 1, wherein receiving the first user input comprises receiving a second signal from a mobile electronic device.

13. The method of claim 1, further comprising, in response to receiving the first user input, outputting an audible signal to the user instructing the user to touch the first wall.

14. A device comprising:
a radar sensor configured to sense movement of a user in a room; and
processing circuitry configured to:
receive a first user input;
determine, based on a signal from the radar sensor, the movement of the user in the room after receiving the first user input;
determine a first estimated location of a first wall in the room based on a first portion of the movement of the user;

determine a second estimated location of a second wall in the room based on a second portion of the movement of the user;

generate a static point cloud of non-moving objects in the room;

modify at least one of the first estimated location and the second estimated location based on the static point cloud; and modify the static point cloud based on the movement of the user.

15. The device of claim 14, wherein the processing circuitry is further configured to:

determine a third estimated location of the first wall based on the static point cloud; and determine a combined estimated location of the first wall based on the first and third estimated locations of the first wall.

16. The device of claim 14, wherein the processing circuitry is further configured to receive a second user input, and wherein the processing circuitry is configured to determine the movement of the user after receiving the first user input and before receiving the second user input.

17. The device of claim 14, wherein the movement is a first movement, and wherein the processing circuitry is further configured to:

determine the first movement of the user based on signals received by the radar sensor;

receive a third user input; and determine an estimated tilt angle of the radar sensor based on a second movement of the user after receiving the third user input.

18. A non-transitory computer-readable medium having executable instructions stored thereon, configured to be executable by processing circuitry for causing the processing circuitry to:

receive a first user input;

determine, based on a signal from a radar sensor, movement of a user in a room after receiving the first user input;

determine a first estimated location of a first wall in the room based on a first portion of the movement of the user;

determine a second estimated location of a second wall in the room based on a second portion of the movement of the user;

generate a static point cloud of non-moving objects in the room;

modify at least one of the first estimated location and the second estimated location based on the static point cloud; and modify the static point cloud based on the movement of the user.

19. The non-transitory computer-readable medium of claim 18, wherein the instructions are configured to be executable by the processing circuitry for further causing the processing circuitry to:

determine a second estimated location of the first wall based on the static point cloud; and determine a combined estimated location of the first wall based on the first and second estimated locations of the first wall.

20. The non-transitory computer-readable medium of claim 18, wherein the movement is a first movement, and wherein the instructions are configured to be executable by the processing circuitry for further causing the processing circuitry to:

determine the first movement of the user based on signals received by the radar sensor;

receive a third user input; and determine an estimated tilt angle of the radar sensor based on a second movement of the user after receiving the third user input.

* * * * *